Nov. 12, 1940.  G. F. DODGE ET AL  2,221,444
PROCESS OF AND APPARATUS FOR TREATING SEWAGE
Filed Nov. 6, 1936  3 Sheets-Sheet 2

INVENTORS,
GORDON F. DODGE AND
GUSTAVE A. OVERSTROM,
By Chas. M. Nissen,
ATTY.

INVENTORS;
GORDON F. DODGE AND
GUSTAVE A. OVERSTROM.
By Chas. M. Nissen,
ATTY.

Patented Nov. 12, 1940

2,221,444

UNITED STATES PATENT OFFICE 2,221,444

PROCESS OF AND APPARATUS FOR TREATING SEWAGE

Gordon F. Dodge, Columbus, Ohio, and Gustave A. Overstrom, Big Sur, Calif., assignors to The Jeffrey Manufacturing Company, a corporation of Ohio Application November 6, 1936, Serial No. 109,554

13 Claims. (Cl. 210—3)

This invention relates to a new and improved process of and apparatus for treating sewage and particularly a new process and apparatus for efficiently, yet economically, removing inorganic grit from sewage and cleaning it to free it of all organic or putrescible matter.

An object of the invention therefore is to provide an efficient but economical process and apparatus for removing grit from a flowing stream of sewage and cleaning the grit to free it of all objectionable matter, such as putrescible organic matter.

A more specific object of the invention is to provide such a process and apparatus as above described in which a concentrating or separating table is employed as an important element to effect the aforesaid separation and cleaning of sewage grit.

Another object of the invention is to provide a process and apparatus of the above described type in which means are provided to scrub the inorganic grit and to reduce the organic matter to a relatively fine state thereby to effect a clean separation of the grit and organic materials.

Still another object of the invention is to provide an apparatus of the above type and a process of the above type in which a screen is provided to insure that only relatively fine material will be fed to the concentrating table.

Still another object of the invention is to provide a method and apparatus as above described in which the products flowing from the concentrating table comprise concentrates, middlings and tailings in which the tailings are returned to the sewage stream and in which the middlings will be given a further classifying action to effect a complete separation of them into tailings and concentrates, which second tailings are also returned to the sewage stream.

Other objects of the invention will appear hereinafter, the novel features and combinations being set forth in the appended claims.

In the accompanying drawings:

Fig. 4 is an enlarged detail view showing the middlings classifier and its feed;

In the design of modern sewage treatment plants, particularly as employed by municipalities, it is common to employ a digester system in which the putrescible content of the sewage is digested. It has been found in practice that for such systems to operate properly it is necessary that the inorganic solids which are not digestible by a bacteriological action should be first removed before the sewage is fed to the digester. The process and apparatus herein disclosed is designed to remove the inorganic or gritty solids which are undigestible and to separate said gritty solids from the organics and also to wash said inorganic solids free of any adhering organic matter, particularly putrescible organic matter which would make the removed inorganics objectionable.

Figure 1:
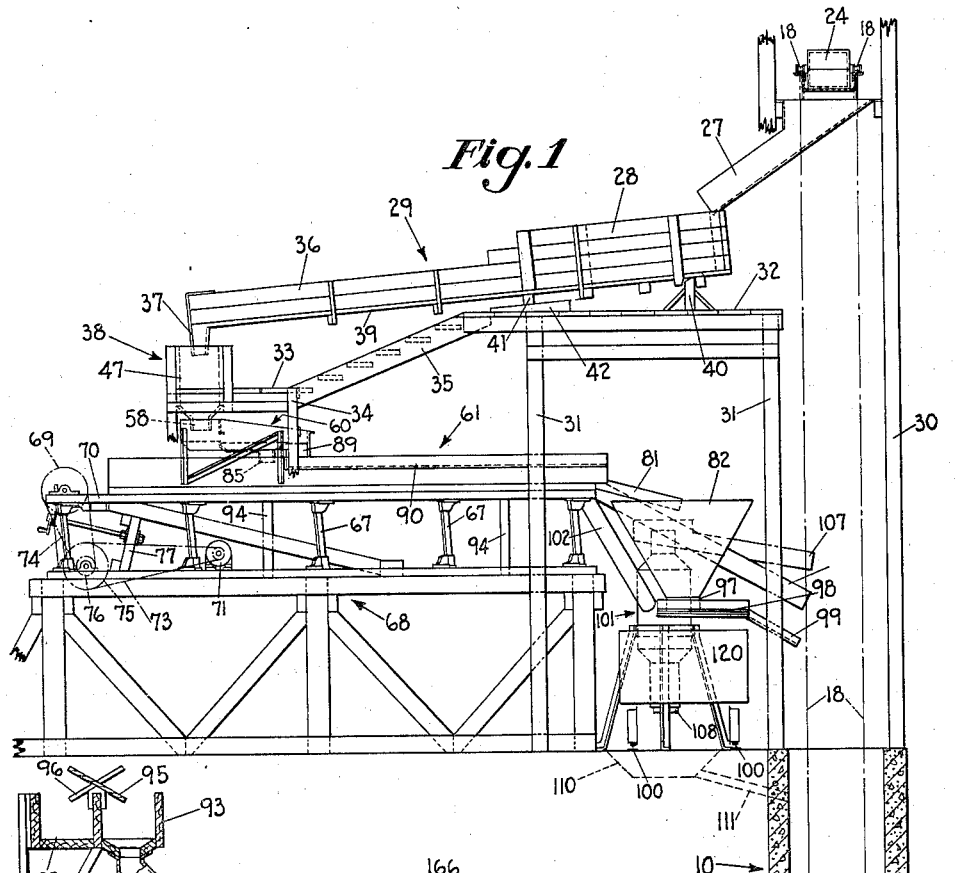
Fig. 1 is a transverse elevational view of the apparatus comprising our invention showing the grit channel in section.
Figure 2:
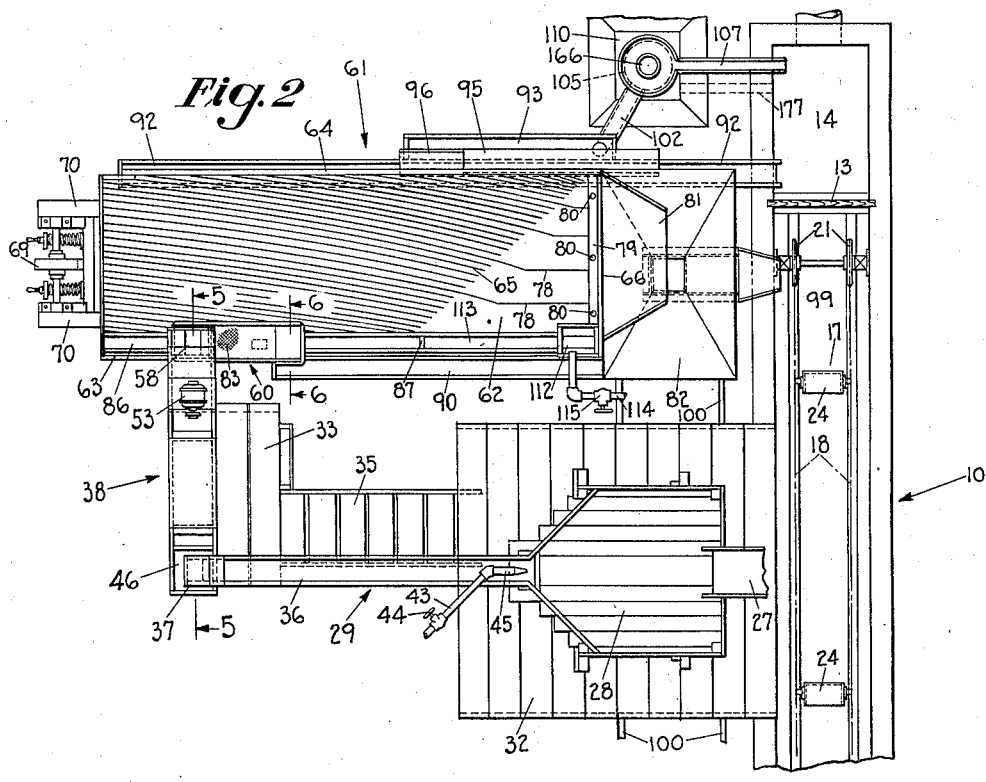
Fig. 2 is a plan view of the apparatus disclosed in Fig. 1 with the influent end of the grit channel cut short.
Figure 3:
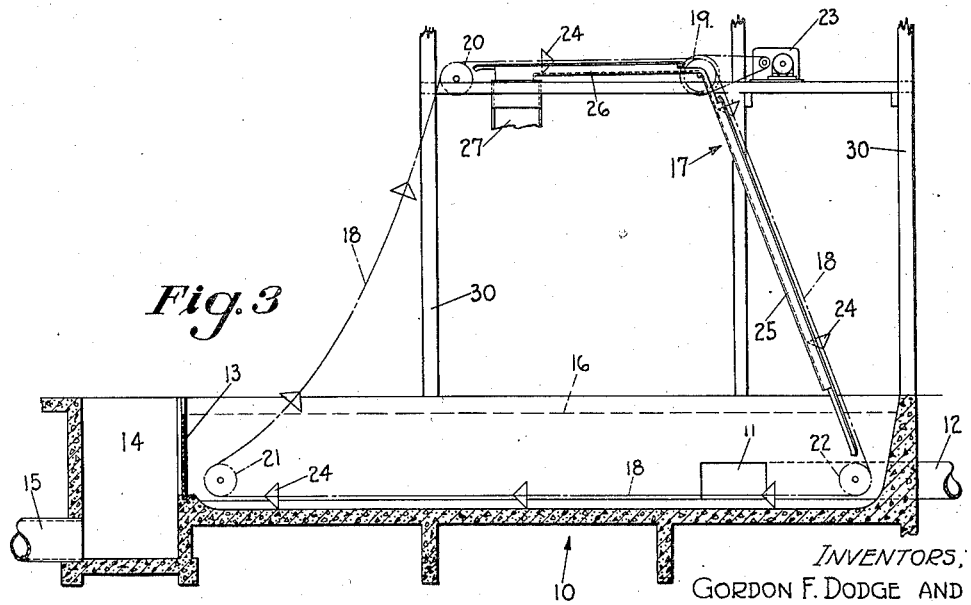
Fig. 3 is a longitudinal sectional view of the grit channel showing also schematically the collecting and conveying means associated therewith.

Referring particularly to Figs. 1, 2 and 3 of the drawings, we provide a grit channel or settling tank 10 preferably formed as a monolith of poured concrete which is adapted to be fed through an influent opening 11 from an influent sewage pipe 12. In general, the sewage flowing through the pipe 12 and opening 11 will have been previously screened by an appropriate screening apparatus to remove the very large particles of material which may have been subsequently ground to a relatively small size and returned to the sewage stream and thus flow into the grit channel 10 through the sewage pipe 12. We prefer to incorporate such a screen ahead of the grit channel 10.

Sewage flowing into the grit channel 10 will fill said channel to an adjustable height as determined by the overflow weir 13 adjacent the effluent sump 14 from which the sewage will flow to the digester system by the sewage pipe 15. It will be evident that the sewage flowing through the channel 10 will flow at a relatively low velocity as compared to its rate of flow in the pipe 12. It is also evident that the level of the sewage in the grit channel 10 may be determined as indicated by the dotted line 16.

Due to the reduced velocity of the sewage stream as it flows through the grit channel 10 the heavier particles of material, including some materials in suspension, and particularly the particles of material of high specific gravity, such as sand and grit, will settle on the bottom of said grit channel 10. This settled material will form a sludge which includes inorganic or gritty material of high specific gravity, to which there will be adhering a small amount of organic material, and in addition include an appreciable amount of organic material of relatively low specific gravity, particularly large particles thereof, as well as particles of intermediate specific gravity, such as coal and coke.

Associated with the grit channel 10 is a conveyor mechanism 17 which may comprise a pair of spaced continuous draft chains 18, 18 guided about a plurality of pairs of guide sprockets 19, 20, 21 and 22, one sprocket of each pair being associated with one of the chains 18, 18. An appropriate motor and speed reduction mechanism 23 is provided to drive the chains 18, 18.

Spaced at intervals and attached to said chains 18, 18 is provided a plurality of V-buckets 24 which, in operation, are adapted to scrape along the bottom of the grit channel 10 and up an inclined drain chute 25, thence to a sloping discharge chute 26 upon which the sludge in the buckets 24 is discharged and scraped to a laterally extending chute 27 by which the material is fed into a receiving hopper 28 of an adjustable feed mechanism 29.

As clearly shown in Figs. 1, 2 and 3 of the drawings, the sprockets 19 and 20, the motor and speed reduction mechanism 23 and the chutes 26 and 27 are supported at an appreciable height above the grit channel 10 and above the floor upon which the apparatus is supported by means of an appropriate framework, including upstanding members 30.

The feed mechanism 29 is supported upon an appropriate framework 31, including a top platform 32, access to which may be gained from a lower platform 33 supported upon an appropriate framework 34 by a stairway 35.

The feed mechanism 29 comprises the previously mentioned hopper 28 which feeds a trough or sluice 36, which sluice 36 is provided with a discharge chute 37 which feeds a beater mechanism 38, hereinafter described in complete detail. Said feed mechanism 29 includes a rigid bottom 39, one end of which is pivotally supported upon an upstanding support 40. Associated with a transversely extending bolster 41 is a longitudinally adjustable wedge 42 which may be adjusted to determine variably the slope of the bottom 39 of said feed mechanism 29.

It has been found in practice that if material such as sludge is supplied with water in a feed mechanism of the type above described that the rate of flow of the material may be very accurately controlled by controlling the amount of water in the mixture and the slope of the bottom 39. We therefore provide means for supplying water to the hopper 28 which may take the form of a fresh water supply pipe 43 provided with a control valve 44 and a nozzle 45. The nozzle 45 is particularly useful in that it will cause the water to be fed to the hopper 28 at a high velocity and thus will, at least in part, tend to free the inorganic or gritty matter of adhering particles of organic matter and in addition will tend to disintegrate or reduce any particles of organic matter which may be easily reduced or disintegrated. We also contemplate the using of the sewage water instead of fresh water for this purpose. In case that sewage water is employed the pipe 43 will be fed said sewage water which may be drawn from the pipe 12 or the grid channel 10 by a high pressure pump. It is thus evident that the sludge which is received in the hopper 28 may be thoroughly mixed with water and fed at a relatively constant, but variably controllable, rate to the beater mechanism 38.

The function of the beater mechanism 38 is to clean the grit thoroughly of adhering organic matter and to reduce any particles of material which are easily reducible, such as large particles of organic material, so that they may be properly treated by the subsequent apparatus.

Figure 5:
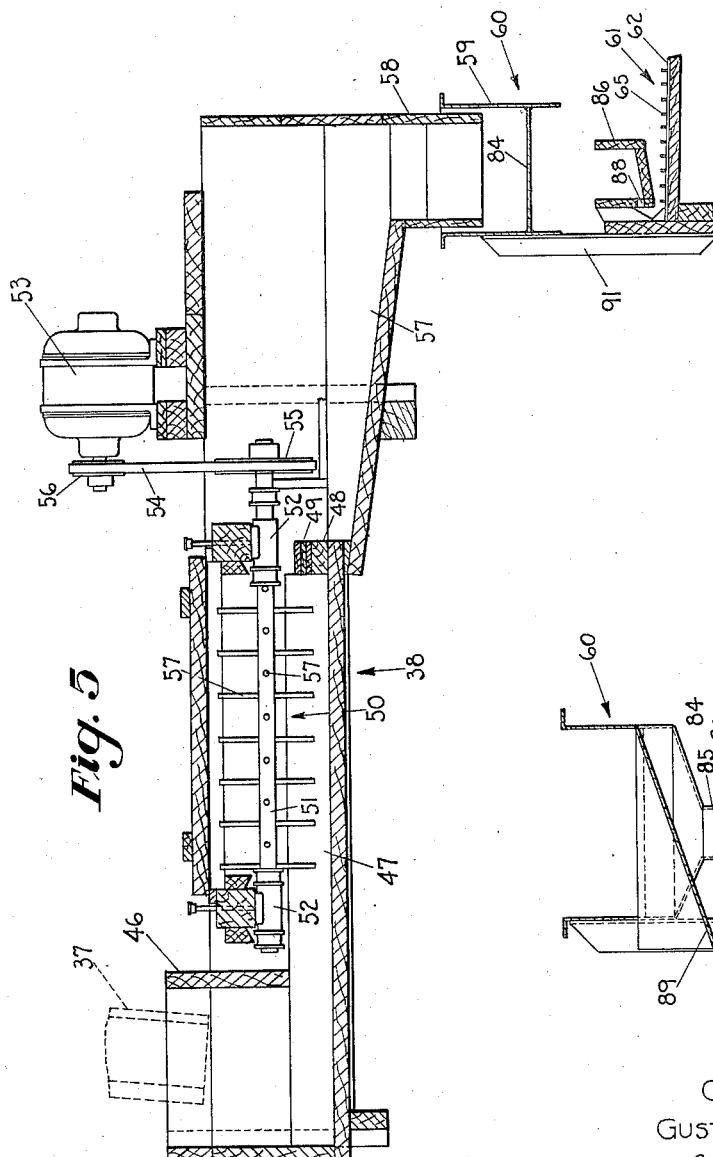
Fig. 5 is a longitudinal sectional view taken on the line 5—5 of Fig. 2 looking in the direction of the arrows and showing the construction of the beater.

As clearly seen in Fig. 5 of the drawings, the beater mechanism 38 comprises a receiving hopper 46 which is fed by the chute 37 of the previously described feed mechanism 29. The beater mechanism includes a longitudinally extending box-like casing 47 having an overflow weir 48, the height of which may be adjusted by removable boards 49. It will be evident the mixture of sludge and water fed to said beater mechanism 38 will fill the casing 47 to a height determined by the weir 48.

Positioned within the casing 47 is a beater mechanism rotor 50 which is adapted to churn the material thoroughly and to scrub it, at the same time effecting a reducing or disintegrating action thereon. This beater rotor therefore will thoroughly scrub and clean the inorganic material, freeing it of any adhering organic material while reducing any readily reducible particles of material, such as any relatively large particles of organic material.

Said beater rotor 50 comprises a longitudinally extending shaft 51 mounted upon appropriate journal bearings 52, 52, and driven from an electric motor 53 through a V-belt 54 and a pair of V-belt pulleys 55 and 56. Said shaft 51 also carries a plurality of radial arms 57 which, upon rotation of the rotor 50, extend down below the surface of the liquid in the casing 47. Said rotor 50 will be rotating at a relatively fast rate, such as 600 revolutions per minute, and thus will very effectively perform the scrubbing and reducing action, as above described. The thoroughly scrubbed and reduced sludge, mixed with water, will be discharged over the weir 48 and guided by a trough 57 to a chute 58 by which it will be discharged into the feed hopper 59 of a screen 60 carried by a concentrating or separating table 61.

The construction of the concentrating or separating table 61, in general, preferably follows the construction of the Ore concentrating table disclosed in the patent of Gustave A. Overstrom, No. 1,417,682, patented May 30, 1922, except for such differences as will be hereinafter specifically pointed out. Briefly described, said table 61 comprises a flat deck 62 which is level longitudinally of its length but which is sloping in a lateral direction from the feed edge 63 to the discharge edge 64, which slope may be adjusted. Said deck 62 is provided with a plurality of riffles 65 which extend in a general longitudinal direction but which are formed curvilinear following generally arcs of a relatively large circle, the center of which is in alignment with the lefthand end of said table as viewed in Figs. 1 and 2 of the drawings.

As a consequence of the lateral sloping of the deck 64 it will be evident that any material caught between the riffles 65 which, of course, will be the heavy or high gravity materials which we call concentrates, will tend to move upwardly along said deck 62 as they are conveyed to the concentrates discharge end 66 of said table 61.

The deck 62 is preferably supported upon a plurality of cantilever springs 67 adjacent each side thereof, which cantilever springs are rigidly attached at their bottoms to a main frame 68 and are rigidly attached at their tops to said deck 62. Said cantilever springs also preferably make an acute angle with the plane of the deck 62 whereby upon vibration of said deck 62 it will be given a motion having both a vertical and a horizontal component of movement whereby any solid material on said deck will be conveyed longitudinally thereof to the concentrates discharge end 66, while stratifying the material on the deck.

To provide for the vibration of the deck 62 there is provided an unbalanced pulley 69 mounted in appropriate journal bearings upon frame extensions 70, 70 of said deck 62. The pulley 69 is driven from an appropriate electric motor 71 through an appropriate drive mechanism including belts 73 and 74 and pulleys 75 and 76. An adjustable bumper mechanism 77 is provided so that the deck 62 will receive a sudden bump or shock at the forward throw of each vibratory movement. This increases the rate of travel of the material, particularly the concentrates, and keeps the deck clean at all times.

In addition to the form of the cantilever springs 67, as above described, they are all so adjusted that their transverse planes diverge from a plane at right angles to the length of the deck by increasing amounts as said springs approach the discharge end 66 of said deck. This is for the purpose of giving the deck 62 an arcuate motion during each vibration. This arcuate motion will, in general, follow the curvature formed by the riffles 65 but it is an arc of a smaller radius. As a consequence, material which is being conveyed in a generally longitudinal direction along the deck 62 will be progressively moved upwardly toward the feed edge 63 while moving towards the concentrates discharge end 66. Furthermore, this rate of travel upwardly will be greater than the upward curvature of the riffles 65. As a consequence, the grit or concentrates will accumulate adjacent the lower faces of the riffles 65 which provides a very efficient and improved mode of separation as described in full detail in the aforementioned patent.

As clearly illustrated in Fig. 2 of the drawings, most of the riffles 65 terminate short of the end 66 and form a triangular area on the deck 62 which is substantially free of riffles. However, there is preferably provided a few riffles, seen at 78, which extend continuously to the end 66. These riffles 78 are preferably extended longitudinally of the deck 62 adjacent most of the distance leading to the end 66. This is provided to insure the flow of the concentrates or grit into the concentrates or grit receiving trough 79 adjacent the end 66. Said trough 79 is provided with a plurality of large holes 80 in its bottom through which the concentrates may flow with water to a chute 81 by which they are fed to a drain hopper 82, hereinafter described in full detail.

As previously mentioned, adjacent the feed edge 63 of the deck 62 there is carried a screen 60 provided with a screen cloth 83 to effect a classification of the material according to size. Any material which is capable of passing through the screen 83 will be received in the screen bottom 84 (see Fig. 6) and directed by a chute 85 to a feed trough 86 which extends along the upper rear end of the deck 62. The effective length of this trough 86 may be adjusted in a manner well understood in the art, as by a partition 87.

Figure 6:
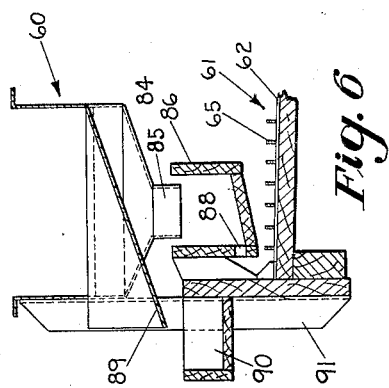
Fig. 6 is a transverse sectional view taken on the line 6—6 of Fig. 2 looking in the direction of the arrows.

As clearly seen in Fig. 6 of the drawings, the feed trough 86 is provided with a plurality of longitudinally extending bottom openings 88 which will feed the mixture of fine sludge and water to the upper rear edge of the table 61. As also clearly seen in Figs. 2 and 6 of the drawings, the large particles of material which cannot pass through the screen cloth 83 will be directed to the end of the screen 60 and guided by a chute 89 into a trough 90 by which they will be conveyed to the drain hopper 82, hereinafter described.

It will be evident that since the screen 60 and the trough 90 are rigidly attached to and supported by the table 61 they will receive the vibratory action of said table 61. As a consequence, they will impart a conveying action to any material supported by them to convey said material to the right, as viewed in Fig. 2 of the drawings.

The support for the screen 60 from the table 61 may take the form of a plurality of angle members, one of which is seen at 91 in Fig. 6 of the drawings.

It is also preferred that means be provided to feed clean or fresh water to the table 61, particularly adjacent the upper right hand edge thereof, as viewed in Fig. 2. Said means comprises a hopper 112 which feeds a trough 113, generally similar in construction to the trough 86 and comprises a continuation thereof. It will be evident that the partition 87 may be employed to control simultaneously the effective lengths of the troughs 86 and 113. Fresh water will be supplied to the hopper 112 from a fresh water pipe 114 controlled by a valve 115. This clean water is preferably provided so that it will wash down over the concentrates formed adjacent the discharge end of the table 61, particularly where the riffles 65 have terminated to wash the concentrates entirely clean and to flow in part with the concentrates into the trough 79.

In the operation of the table 61 the mixture of sludge and water to be separated will, of course, be fed from the feed trough 86, as above described. This mixture will then tend to flow laterally across the deck 62 with the heavy gravity particles, such as the grit and inorganic material settling and being caught by the riffles 65. The low gravity material, such as organic material, will form what we call tailings and flow over the riffles 65 and over the discharge edge 64 of the table 61. It is thus evident that the concentrates will be caught by the riffles 65 and conveyed to the concentrate discharge end 66 while the tailings flow over the edge 64.

In practice, it is frequently found that middlings are formed which constitute a mixture of concentrates, tailings, and relatively large particles of inorganic material of intermediate specific gravity, such as coal and coke, including relatively large particles of concentrates or grit, and relatively small particles of tailings or organic material. These middlings will be discharged adjacent the lower right hand end of the deck 62 in a manner well understood in the ore concentrating art. Separate troughs are therefore provided for the receiving of the tailings and the middlings comprising a tailings trough 92 (see Figs. 2 and 4) and a middlings trough 93. These troughs 92 and 93 are mounted upon the stationary main frame 68 by appropriate brackets 94 and thus do not partake of the movement of the deck 62.

To prevent the middlings from flowing into the tailings trough 92 there is provided a deflector plate 95 adjacent the middlings trough 93 and substantially co-extensive therewith. However, adjacent the front end of the middlings trough 93 there is provided an oppositely sloping plate 96 which directs material to the trough 93. Plate 96 is rigidly attached to the plate 95 and both of them may be slid longitudinally. As a consequence, an adjustment is provided for determining the exact point along the discharge edge 64 of the table 61 at which the discharged material is directed to the tailings trough 92 and to the middlings trough 93.

The tailings trough 92 is extended so that it discharges the tailings into the effluent sump 14, thus returning it to the sewage stream.

It will be evident that the tailings will be formed substantially entirely of water and organic material. The concentrates or inorganic material, principally grit, are fed to the drain hopper 82, as previously described, which is provided with a movable gate associated with the discharge chute 97 thereof, which gate allows the water to drain from the hopper 82 at all times, and to be received by a trough 98 by which it is fed to a chute 99 which returns the drained material to the sump 14 of the grit channel 10.

Positioned below the hopper 82 are rails 100 upon which a small car 120 may ride and be pushed under said hopper 82 to receive the cleaned grit after it has been properly drained, as above described.

In order to effect a thorough cleaning of the middlings and thereby to separate the grit from the tailings, or in other words, to separate the organic from the inorganic material found therein, the middlings trough 93 feeds an upward current classifier 101 through a pipe 102. Clean water is supplied to the classifier 101 through a pipe 103 controlled by a valve 104, and the water will flow upwardly through the main container or column 105 of said classifier 101 and out of the open top 106 thereof into a drain chute 107, which directs the liquid and suspended organic matter into the effluent sump 14.

The upward current classifier is a well-known form of separator and operates by the upwardly moving water carrying the lighter gravity materials to the top while the heavy gravity materials sink to the bottom. The bottom is preferably provided with a plug 108 having a discharge opening 109 to permit the free discharge of settled solids at all times.

It will, of course, be evident that water will be supplied to the classifier 101 at such a rate that considering the size of the opening 109 there will still be an upward flow of water through the main container 105 to effect the separation, as above described.

The settled solids and water flowing through the opening 109 may be received by a catch basin 110 from which the water will be drained into the sump 14 of the grit channel 10 by a pipe 111. This cleaned grit may obviously be removed by any desired means, such as a shovel, and may be loaded into the car 120.

In the operation of the above described apparatus with the consequent carrying out of the process comprising our invention, raw sewage will flow through the pipe 12 and influent opening 11 into the grit channel or settling tank 10.

As the sewage, which will comprise organic and inorganic matter in suspension in water, flows through the grit channel 10 at a relatively slow rate, a sludge will form in the bottom of said grit channel 10 comprising substantially all of the inorganic material in the sewage and including also adhering organic material and large or heavy particles of organic material.

The supernatant liquid will flow over the weir 13 into the effluent sump 14 from which it will flow to the digestion system through the effluent pipe 15. The sludge formed on the bottom of the grit channel 10 will be conveyed by the conveyor 17 and discharged to the chutes 26 and 27, the latter of which will discharge said sludge into the hopper 28 of the adjustable feed mechanism 29.

Either fresh or sewage water will be shot into the receiving hopper 28 at a high velocity and will be effective to wash the inorganic material free of adhering organic material, at least to a certain extent. The mixture of sludge and water will then flow down the sluice 36 and carry the sludge at a predetermined adjustable rate depending upon the rate of feed of water from the nozzle 45 and the slope of the bottom 39, as determined by the position of the wedge 42. This mixture of sludge and water will then be received by the beater mechanism 38 by which it will be thoroughly churned to scrub the inorganic matter, such as grit, sand, coal and other similar materials, free of any adhering organic matter. In addition, any large particles of organic matter will be broken up or disintegrated and reduced to a relatively fine state. This mixture of water and grit, which has been freed of adhering organic material and of the particles of organic material, will flow from the chute 58 of the beater mechanism 37 onto the screen 60 which will be vibrated due to its rigid connection to the concentrating or separating table 61.

The fine material, comprising grit and organic material, will pass through the screen cloth 83 of the screen 60 and be fed by the feed trough 86 adjacent the upper edge of the deck 62 of the table 61. The longitudinal extent over which this feeding takes place may be adjusted by the partition 87. The large particles of material which do not pass through the screen cloth 83, which will be principally large particles of irreducible inorganic matter, will be conveyed to the trough 90 which, due to its vibratory motion as above described, will convey said material to the drain hopper 82. If desired, spray means may be added to spray this material as it passes through trough 90.

The mixture of water, grit and organics fed to the trough 86 will flow laterally and downwardly across the surface or deck 62 of the table 61. At the same time fresh water will flow across the deck 62 adjacent the discharge end thereof from the trough 113.

As said mixture flows across said deck 62 a stratifying action will take place due to the aforesaid vibratory motion of the deck 62 which will result in a deposition of the concentrates or grit between the riffles 65 and a lateral flowing of the tailings, comprising the organics and water, over the discharge edge 64 and into the tailings trough 92. Said tailings will be directed by the trough 92 into the effluent sump 14 of the grit channel 10. The concentrates or grit will be conveyed by the vibratory action of the deck 62 toward the concentrates discharge end 66 with the concentrates forming adjacent the lower faces of the riffles 65, particularly adjacent the right hand end of table 61, as viewed in Fig. 2 of the drawings.

Adjacent the discharge position of said concentrates they will be washed clean by the fresh water and will discharge with a portion of the fresh water into the trough 79 from which they will discharge into the drain hopper 82 by way of the chute 81.

The middlings, comprising principally relatively large particles of intermediate gravity materials, relatively small particles of organic material and relatively large particles of inorganic material, will discharge from the deck 62 at a position adjacent the middlings trough 93. Said middlings will be guided to said trough 93 by the deflector plate 95 which may be adjusted with the extension plate 96 longitudinally of the table 61 to determine the point along the edge 64 of the table 61 at which the division is to be made between middlings and tailings.

The middlings received by the trough 93 will be fed to the upward current classifier 101 which will effect a complete separation of the inorganics and organics with the organics discharged with water by way of the chute 107 to the effluent sump 14 and the inorganics discharged with water into the sump 110 from which the water will drain into the channel 10, or into the effluent sump 14.

The inorganics received by the hopper 82 will be drained of liquid, which liquid will drain into the grit channel 10 or effluent sump 14, and when completely drained said inorganics may be discharged from the hopper 82 through a discharge chute 97 controlled by an appropriate gate or valve into the car 120 which may be rolled into and out of position with respect to said hopper 82. The inorganics received by the basin or sump 110 may also be loaded, as by hand, into the car 120.

It is thus to be noted that we have produced a very efficient, yet relatively inexpensive, apparatus for treating sewage whereby all of the inorganic material or grit which can do harm to the digester system is removed and thoroughly cleaned, thereby to render it non-offensive. At the same time all of the organic material which is removed as a sludge with the grit is returned to the sewage stream to receive the digesting action.

In some instances it has been found that the middlings are relatively free of inorganics and therefore need no further treatment and may be discharged directly into the sewage stream. This may best be effected by removing entirely the deflector plates 95 and 96, in which case the middlings will discharge into the trough 92 along with the tailings. If a preliminary test indicates that it is not necessary to separate the middlings from the tailings the upward current classifier 110 may, of course, be omitted entirely.

Obviously those skilled in the art may make various changes in the details and arrangement of parts without departing from the spirit and scope of the invention as defined by the claims hereto appended, and we therefore wish not to be restricted to the precise construction herein disclosed.

Having thus described and shown an embodiment of our invention, what we desire to secure by Letters Patent of the United States is:

1. The process of separating inorganic material found in sewage comprising flowing sewage over an inclined surface, and imparting a stratifying motion to said surface.

2. The process of separating grit and other inorganic material found in sewage from the organic material therein comprising feeding settled sludge over a separating table, imparting a motion to said table to effect stratification, and directing the organic material and inorganic material over different paths.

3. The process of treating sewage comprising settling inorganic material and organic material in a relatively quiescent liquid, removing the settled inorganic and organic material, flowing said removed material with water over a riffled separating table to effect a separation of organic and inorganic material, directing said separated materials to different paths, and returning the organic material to the sewage stream.

4. The process of treating raw sewage comprising collecting the heavy particles found in raw sewage from a sewage stream, disintegrating and scrubbing said particles, flowing said disintegrated and scrubbed particles with water over a vibratory separating table, and directing the consequently separated relatively light particles to the sewage stream while directing the relatively heavy particles along a separate path.

5. The process of treating sewage which comprises settling suspended sewage solids in the form of sludge made up of organics and gritty inorganics in a substantially quiescent zone in a flowing stream of sewage, conveying the sludge to a separating table, feeding the sludge with water over said table, vibrating said table to effect stratification of material thereon, discharging the material from said table as three products comprising, inorganics relatively free of organics, organics relatively free of inorganics, and middlings including both organics and inorganics, returning said organics to the sewage stream, further treating the middlings to make a final separation of organics and inorganics, and returning the organics recovered from the middlings to the fluid stream.

6. The process of treating sewage which comprises settling sewage solids in the form of a sludge made up of organics and gritty inorganics in a flowing stream of sewage, conveying the sludge to a separating table, feeding the sludge with water over said table, imparting motion to said table to effect a stratifying action, and directing the separated grit and organics over different paths as they pass from said table.

7. The process of treating sewage comprising settling sewage solids in the form of a sludge made up of organics and gritty inorganics in a flowing stream of sewage, conveying the sludge to a storage hopper, feeding the sludge with water from said hopper to a scrubber and disintegrator to scrub and disintegrate it, screening said scrubbed and disintegrated material to remove the non-disintegrated large particles, feeding the fine screened material to a separating table, vibrating said table to effect a stratifying action to separate grit from organics, directing said grit and organics to different paths, and returning the organics to the sewage stream.

8. The process of treating sewage sludge comprising feeding said sludge with water over an inclined surface, said surface being given a stratifying and conveying motion.

9. In sewage grit removing apparatus, the combination with a concentrating apparatus having a deck with an inclined surface, of means for imparting a stratifying and conveying motion to said deck, a storage hopper for sewage sludge, means for feeding said sludge to said storage hopper, means for feeding water to said hopper, and a sluice adjustable in inclination and positioned to feed sludge with water from said hopper to said deck at a controllable rate.

10. In sewage treating apparatus, the combination with a separating table, of means for vibrating said table to impart a stratifying and conveying action thereto, a settling tank, means for collecting sludge from said tank which contains gritty inorganic material and organic material, scrubbing and reducing means, means for feeding said collected sludge to said scrubbing and reducing means, screen means fed by said scrubbing and reducing means and constructed and arranged to feed the fine particles of sludge to said separating table, and means for delivering the separated grit and organic material along different paths.

11. In sewage apparatus, the combination with a concentrating table constructed and arranged to separate material into concentrates, middlings and tailings, of a settling tank, means for collecting saweage sludge from said tank which sludge contains grit to form a concentrate, organic material to form tailings and a mixture of each to form middlings, of means to feed said sludge with water to said table to be separated as aforesaid, means returning the separated tailings to the sewage stream, means directing the concentrate to a separate position, a classifier, means for feeding the middlings to said classifier, and means for directing the light material from said classifier to said sewage stream.

12. The process of treating sewage which comprises settling suspended sewage solids found in a sewage stream in the form of a sludge made up of organics and gritty inorganics, gathering the sludge and feeding it with water to a gravity separator which separates it into three products comprising, inorganics relatively free of organics, organics relatively free of inorganics, and middlings including both organics and inorganics, returning said organics to the sewage stream, further treating the middlings to make a final separation of organics and inorganics, and returning the organics recovered from the middlings to the fluid stream.

13. The process of treating sewage comprising settling sewage solids in the form of a sludge made up of organics and gritty inorganics in a flowing stream of sewage, gathering and feeding the sludge with water to a screen, screening said sludge to remove non-distintegrated large particles, feeding the fine screened material to a separating table, vibrating said table to effect a stratifying action to separate grit from organics, directing said grit and organics to different paths, and returning the organics to the sewage stream.

GORDON F. DODGE.
GUSTAVE A. OVERSTROM.